| United States Patent [19] | [11] | Patent Number: | 4,581,427 |
|---|---|---|---|
| Dunn et al. | [45] | Date of Patent: | Apr. 8, 1986 |

[54] TWO PART SELF-INDICATING ADHESIVE COMPOSITION

[75] Inventors: David J. Dunn, Twinsburg; Kieran F. Drain, Cleveland, both of Ohio

[73] Assignee: Loctite Corporation, Newington, Conn.

[21] Appl. No.: 719,643

[22] Filed: Apr. 4, 1985

Related U.S. Application Data

[63] Continuation of Ser. No. 498,356, May 26, 1983, abandoned.

[30] Foreign Application Priority Data

May 26, 1982 [IE] Ireland .................................. 1253/82

[51] Int. Cl.$^4$ ............................................... C08F 4/70
[52] U.S. Cl. .................................. 526/147; 156/307.3; 156/310; 526/135
[58] Field of Search .................................. 526/135, 147

[56] References Cited

U.S. PATENT DOCUMENTS

| 3,425,988 | 2/1969 | Gorman et al. | 528/75 |
| 3,753,927 | 8/1973 | Kracklauer | 252/428 |
| 3,855,040 | 12/1974 | Malofsky | 156/310 |
| 4,018,851 | 4/1977 | Baccei | 528/75 |
| 4,076,742 | 2/1978 | Berlin | 260/47 UA |

FOREIGN PATENT DOCUMENTS

1901919 8/1970 Fed. Rep. of Germany.

*Primary Examiner*—Paul R. Michl
*Attorney, Agent, or Firm*—Walter J. Steinkraus; Eugene F. Miller

[57] ABSTRACT

An adhesive composition which exhibits fast curing through large gaps is disclosed. The composition comprises (A) at least one addition polymerizable vinyl-type monomer; (B) at least one free radical stabilizer; and (C) a free radical cure system. The free radical cure system comprises (i) at least one free radical initiator, and (ii) at least one ferrocene type compound.

11 Claims, 3 Drawing Figures

TWO PART SELF-INDICATING ADHESIVE COMPOSITION

This application is a continuation of Ser. No. 498,356 filed May 26, 1983 and now abandoned.

This invention relates to an adhesive composition of the type which exhibits fast curing through large gaps on inactive substrates (substrates not involved in the adhesive cure mechanism) following a controllable induction time. It relates more particularly to a two-component adhesive composition which is applied as a one-part adhesive, when the two components have been mixed.

A major disadvantage of prior art two-part mixed adhesive compositions that are room temperature-curing is that fast curing inevitably means a short pot life and problems with mixing equipment. This problem of a short pot life is conventionally solved by adding an inhibitor to the polymerization system. The inhibitor then reacts with the active species of the catalyst-activator system thus stopping polymerization until the inhibitor is consumed. The larger the amount of inhibitor the longer is the induction period and the smaller the amount of catalyst available at the end of the induction period. As the rate of polymerization is usually a function of the catalyst concentration a long induction period may result in slow and incomplete cure.

Another disadvantage of the said prior art compositions is that a mixture of the two components is difficult to distinguish from either of the components before mixing. It is known to incorporate a first dye in one component, and a second dye in the other component, so that the mixture of the components has a color other than that of either of the dyes. This however is an undesirable complication of the work of manufacturing such compositions.

A further disadvantage is that the mixture, once applied to a pair of substrates which are then placed or cramped in mutual contact, although visible at the edges of the joint, and more fully visible through a substrate if the latter is transparent, gives no visible inkling of its state of cure.

It is an object of the present invention to provide an adhesive composition in which a controllable induction period is followed by rapid polymerization giving complete cure through very large gaps. Another object of the invention is to provide a two-part adhesive composition wherein mixing of the parts produces a color change, enabling the mixture to be instantly recognized as such, and providing a visible remainder of its limited pot life. A further object is to provide an adhesive composition wherein cure is accompanied by a color change.

In accordance with the invention there is provided an adhesive composition of the type which exhibits fast curing through large gaps on inactive substrates following a controllable induction time, which composition comprises (i) at least one addition polymerizable vinyl-type monomer as hereinafter defined;
(ii) a cure system comprising a free radical initiator and at least one accelerator therefor, namely a ferrocene type compound; and
(iii) at least one free radical stabilizer of the quenching type.

The composition may additionally comprise polymeric additives(s), dye(s), pigments(s) or filler(s).

The invention will now be described, by way of example, with reference to the accompanying drawings in which:

Figure 1:
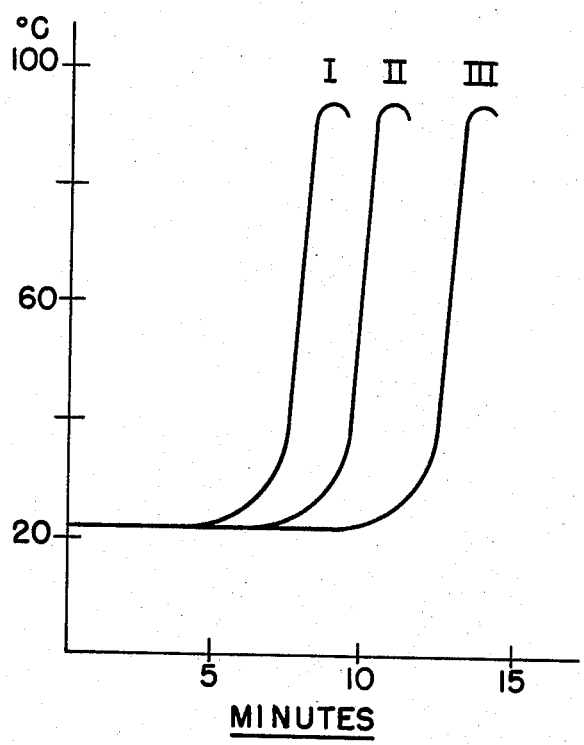
FIG. 1 is a series of exotherms plotted as temperature in °C. versus time in minutes showing the effect of varying stabilizer levels.

The addition polymerizable monomers are preferably selected from the group that consists of monofunctional acrylate or methacrylate esters, diacrylate or dimethacrylate esters, urethane acrylate or urethane methacrylate compounds, and other unsaturated reactive comonomers.

Examples of these monomers (i) are Methyl methacrylate, Butyl methacrylate, Tetrahydrofurfuryl methacrylate, Cyclohexyl methacrylate and the reactive monomers described in U.S. Pat. Nos. 3,425,988 to Toback and Gorman and 4,018,851 to Baccei.

The cure system (ii) typically comprises a free radical initiator and a combination of free radical accelerators one of which is a ferrocene type compound.

Examples of these initiators are Benzoyl peroxide, p-Chlorobenzoyl peroxide, o-Methyl benzoyl peroxide and Lauroyl peroxide.

Examples of ferrocene type compounds are Ferrocene, t-Butyl ferrocene, t-Octyl ferrocene and Vinyl ferrocene.

Preferred accelerators other than ferrocene type compounds are tertiary aromatic amines, such as N,N-Dimethylaniline, N,N-Diethyl-p-toluidine and N,N-Dihydroxyethyl-p-toluidine.

Cure systems of the kind described are capable of producing a surface independent non-anaerobic cure.

The free radical stabilizer is of the quenching type. Examples of these stabilizers are Hydroquinone, 2,6-di-t-Butyl-4-methylphenol and 4-Methoxyphenol.

The invention will be understood in greater detail from the accompanying drawings and the following examples:

EXAMPLE 1

Adhesive compositions were prepared using the following ingredients:
(i) Monomers:
  (1) Tetrahydrofurfuryl methacrylate
  (2) Methacrylic acid
  (3) 1,3-Butylene glycol dimethacrylate
(ii) Cure System:
  (4) Benzoyl Peroxide (initiator)
  (5) Ferrocene (accelerator)
  (6) N,N-Dihydroxethyl-p-toluidine (accelerator)
(iii) Stabilizer:
  (7) 2,6-di-t-Butyl-4-methylphenol
(iv) Polymeric Additives:
  (8) Ethylene methyl acrylate copolymer.

In formulating useful two-part compositions from these ingredients, ingredient 4 must be kept apart from ingredients 5 and 6 by separate packaging or other means well known in the art.

A stock solution was made up according to the following recipe, in which the ingredients are designated by the respective numbers given above. The quantities are to be understood as parts by weight totalling 100.

| Stock Solution | Quantities |
|---|---|
| (1) Tetrahydrofurfuryl methacrylate (i) | 58.85 |
| (2) Methacrylic acid | 10.42 |
| (3) 1,3-Butylene glycol dimethacrylate (i) | 2.08 |
| (8) Ethylene methyl acrylate copolymer (iv) | 28.65 |
| Total | 100.00 |

Two-part adhesive compositions were then made up using this stock solution and ingredients 4–7 the proportions of which were as follows:

| | Quantities |
|---|---|
| Part 1. | |
| (4) Benzoyl peroxide (ii) | 1.0 |
| (7) 2,6-di-t-Butyl-4-methoxyphenol (iii) | 0.1 |
| Stock Solution sufficent to add up to | 100.0 |
| Part 2. | |
| (5) Ferrocene | 0.2 |
| (6) N,N—Dihydroxyethyl-p-toluidine | 1.0 |
| Stock Solution sufficent to add up to | 100.0 |

On mixing Part 1, which was yellow, with Part 2, which was orange, a green solution was obtained and an induction time began. Following this induction period there was a period of rapid polymerization producing a hard yellow polymer. These color changes are of course of great utility to the user; the composition may be termed self-indicating by virtue of them.

EXAMPLE 2

Figure 3:
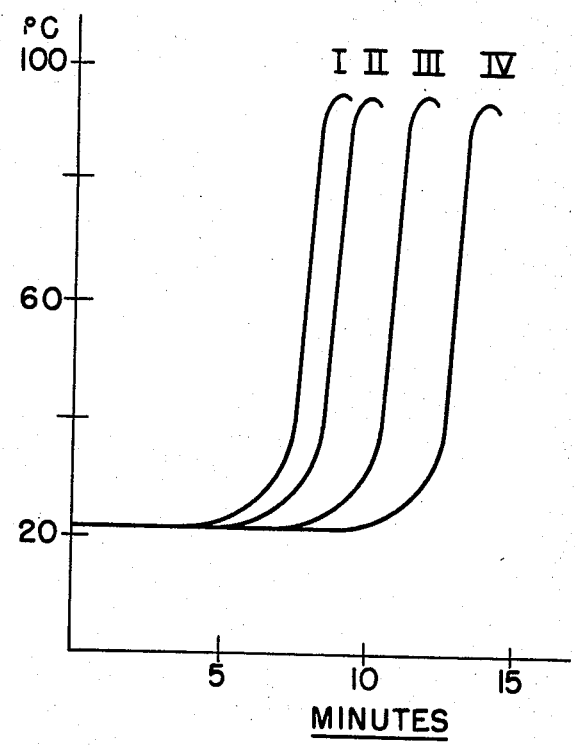
FIG. 3 is a series of exotherms plotted in °C. versus time in minutes showing the effect of varying accelerometer levels.
Figure 2:
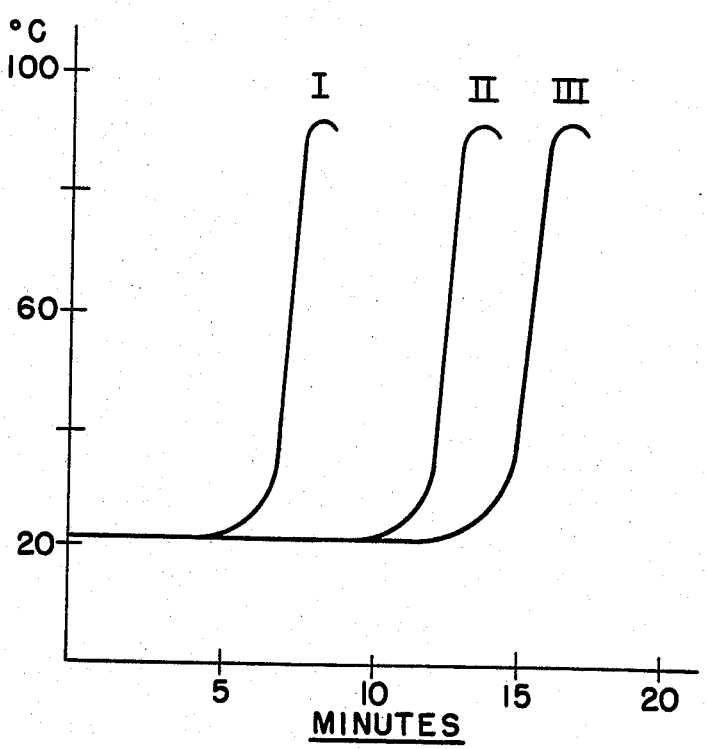
FIG. 2 is a series of exotherms plotted as temperature in °C. versus time in minutes showing the effect of varying initiator levels.

Represented in FIGS. 1–3 are polymerization exotherms recorded with a thermocouple recorder unit and plotted as temperature in °C. versus time in minutes.

FIG. 1 shows how the induction time may be varied by changing the proportion of the 2,6-di-t-Butyl-4-methylphenol stabilizer in the composition of Example from 0.050 wt. % (line I), 0.075 wt. % (line II), to 0.100 wt. % (line III).

FIG. 2 shows that this effect also may be achieved by varying the proportion of the benzoyl peroxide initiator from 0.75 wt. % (line I), 1.00 wt. % (line II), to 1.50 wt. % (line III); and FIG. 3 shows that this effect also may be achieved by varying the proportions of the ferrocene and N,N-Dihydroxyethyl-p-toluidine in the accelerator system, respectively, in the composition, in accordance with the following (all parts are parts by weight):

| | Accelerator System | |
|---|---|---|
| Line No. | Ferrocene | N,N—Dihydroxy-ethyl-p-toluidine |
| I | 0.40% | 1.50% |
| II | 0.40% | 1.00% |
| III | 0.20% | 1.50% |
| IV | 0.20% | 1.00% |

EXAMPLE 3

A two-part adhesive composition was made up according to the following recipe. The quantities are to be understood as parts by weight. Each part of this composition adds up to 100.

| | Quantities |
|---|---|
| Part 1. | |
| (1) Tetrahydrofurfuryl methacrylate (i) | 43.00 |
| (2) Methacrylic acid (i) | 10.00 |
| (3) 1,3-Butylene glycol dimethacrylate (i) | 2.00 |
| (4) Benzoyl peroxide (ii) | 1.25 |
| (7) 2,6-di-t-Butyl-4-methyl phenol (iii) | 0.125 |
| (8) Ethylene methyl acrylate copolymer (iv) | 22.125 |
| Methyl methacryate butyl methacrylate copolymer (iv) | 20.00 |
| Silicon dioxide (iv) | 1.50 |
| Part 2. | |
| (1) Tetrahydrofurfuryl methacrylate (i) | 43.00 |
| (2) Methacrylic acid (i) | 10.00 |
| (3) 1,3-Butylene glycol dimethacrylate (i) | 2.00 |
| (5) Ferrocene (ii) | 0.25 |
| (6) N,N—Dihydroxyethyl-p-toluidine (ii) | 1.00 |
| (7) 2,6-di-t-Butyl-4-methyl phenol (iii) | 0.15 |
| (8) Ethylene methyl acrylate copolymer (iv) | 22.10 |
| Methyl methacrylate butyl methacrylate copolymer (iv) | 20.00 |
| Silicon dioxide (iv) | 1.50 |

For use, equal weights of the two parts were intimately mixed and the mixture applied to a 2.54×1.27 cm area on each of a pair of 2.54 cm wide abraded gel coat glass-reinforced plastics strip substrates. The treated areas were placed in contact and clamped together. Uniform bond gaps of 4 mm were achieved with the use of glass spacers. The bonds were allowed to set.

A number of such bonds was allowed to stand at room temperature for 24 hours to develop full cure. They were then tested to destruction according to ASTM D1002-64 to determine their tensile shear strength in decaNewtons per square centimeter ($daNcm^{-2}$). The mean result recorded was 23 $daNcm^{-2}$ with substrate failure being observed in each case.

Thus the ultimate strengths recorded were determined by the cohesive strength of the substrate which was less than the forces of adhesion operating.

An inducation time of 30 minutes was recorded for the assembled adhesive using both the polymerization exotherm and color change as indicators.

We claim:

1. A two part curable adhesive which changes color when the two parts are mixed and again upon curing the adhesive comprising:
   (A) A first part comprising:
      (i) at least one polymerizable acrylate or methacrylate ester monomer,
      (ii) an organic peroxide selected from benzoyl peroxide, p-chlorobenzoyl peroxide, o-methyl benzoyl peroxide and lauroyl peroxide; and (iii) a free radical stabilizer of the quenching type, and
   (B) Second part comprising
      (i) a ferrocene compound
      (ii) a tertiary aromatic amine and
      (iii) a free radical stabilizer of the quenching type.

2. An adhesive as in claim 1 wherein the second part further comprises an acrylate or methacrylate ester monomer.

3. A method of bonding a pair of substrates with an activated curable adhesive by applying said adhesive to at least one of the substrates and joining same until the adhesive cures, the method characterized in that the adhesive changes color a first time upon activation; provides an extended induction period between activation and onset of a rapid curing reaction; and comprises (a) at least one polymerizable acrylate or methacrylate ester monomer;
(b) an organic peroxide free radical initiator selected from benzoyl peroxide, p-chlorobenzoyl peroxide, o-methylbenzoyl peroxide and lauroyl peroxide;
(c) a free radical stabilizer of the quenching type;
(d) a ferrocene compound; and
(e) a tertiary aromatic amine.

4. The method of claim 3 further characterized in that adhesive is visible after joining said substrates, either though one of said substrates or at an edge of the joint, the adhesive changes color a second time during said curing reaction, the substrates are joined together in the time between said first and second color changes and the substrates are then maintained in joined relationship until after said second color change.

5. The method of claim 4 wherein the ferrocene compound is selected from ferrocene, t-butyl ferrocene, t-actyl ferrocene and vinyl ferrocene.

6. The method of claim 4 whenever the free radical stabilizer is selected from hydroquinone, 2-4-di-t-butyl-methylphenol aid 4-methoxyphenol.

7. The method of claim 4 wherein said tertiary aromatic amine is selected from N,N-dimethylaniline, N,N-diethyl-p-toluidine and N,N-dihydroxyethyl-p-toludine.

8. The method as in claim 4 wherein said first color change produces a green composition.

9. The method as in claim 4 wherein said second color change produces a yellow polymer.

10. The method of claim 3 wherein said activated adhesive is formed by mixing a first composition free of a ferrocene compound and including said peroxide, with a second peroxide free composition which includes said ferroene compound.

11. In a method of bonding a pair of substrates with a curable adhesive comprising applying the adhesive to at least one of the substrates, joining the substrates and maintaining the joined substrates in champed relationship until the adhesive has cured, the improvement comprising (a) that the adhesive is a two part adhesive which turns green upon mixing the two parts and turns yellow upon curing, the adhesive comprising
(A) A first part comprising:
(i) at least one polymerizable acrylate or methacrylate ester monomer,
(ii) an organic peroxide selected from benzoyl peroxide, p-chlorobenzoyl peroxide, o-methyl benzoyl peroxide and lauroyl peroxide; and
(iii) a free radical stabilizer of the quenching type, and
(B) Second part comprising
(i) a ferrocene compound
(ii) a tertiary aromatic amine and
(iii) a free radical stabilizer of the quenching type; and (b) that at least a portion of the mixed adhesive on the joined substrates is observed for color change from green to yellow as an indicator of the cure of the adhesive.

* * * * *